(12) United States Patent
Li et al.

(10) Patent No.: US 12,381,426 B2
(45) Date of Patent: Aug. 5, 2025

(54) STATOR SUPPORT FOR LARGE-DIAMETER ELECTRIC MOTOR AND STATOR

(71) Applicant: BEIJING GOLDWIND SCIENCE & CREATION WINDPOWER EQUIPMENT CO., LTD., Beijing (CN)

(72) Inventors: Yanhui Li, Beijing (CN); Liang Peng, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 927 days.

(21) Appl. No.: 17/595,659

(22) PCT Filed: Jan. 19, 2020

(86) PCT No.: PCT/CN2020/072998
§ 371 (c)(1),
(2) Date: Nov. 22, 2021

(87) PCT Pub. No.: WO2020/238266
PCT Pub. Date: Dec. 3, 2020

(65) Prior Publication Data
US 2022/0224175 A1    Jul. 14, 2022

(30) Foreign Application Priority Data
May 27, 2019  (CN) .......................... 201910447712.0

(51) Int. Cl.
H02K 1/18    (2006.01)
H02K 7/00    (2006.01)

(52) U.S. Cl.
CPC ............. H02K 1/187 (2013.01); H02K 7/003 (2013.01); H02K 2213/12 (2013.01)

(58) Field of Classification Search
CPC ........ H02K 1/187; H02K 7/003; H02K 7/183; H02K 15/0006; H02K 15/14; H02K 5/04; H02K 2213/12; Y02E 10/72
See application file for complete search history.

(56) References Cited

U.S. PATENT DOCUMENTS 6,836,036 B2 * 12/2004 Dube ..................... H02K 1/148
                                                310/67 R
7,067,953 B1 *  6/2006 Hans ..................... H02K 1/187
                                                310/401

(Continued)

FOREIGN PATENT DOCUMENTS

CN    1446393 A    10/2003
CN    1719025 A     1/2006

(Continued)

OTHER PUBLICATIONS

Australian Examination report No. 1 dated Aug. 23, 2022; Application No. 2020285795.

(Continued)

Primary Examiner — Emily P Pham

(57) ABSTRACT

The present disclosure relates to a stator support and a stator. The stator support is applied to a large-diameter electric motor. The stator support includes a stator shaft, coaxially connectable to a fixing shaft of the electric motor; a supporting assembly, coaxially arranged at an outer circumference of the stator shaft; a stator ring, connectable to a stator iron core of the electric motor, in which the stator ring includes two or more stator ring segments continuously distributed in a circumferential direction of its own, each of the stator ring segments is in a sector shape, and the two or more stator ring segments are coaxially arranged at an outer circumference of the supporting assembly.

12 Claims, 4 Drawing Sheets

(56) References Cited

U.S. PATENT DOCUMENTS

| | | | |
|---|---|---|---|
| 8,575,871 | B1 | 11/2013 | Moore |
| 9,793,766 | B2 | 10/2017 | Cortada Acosta |
| 2015/0176571 | A1 | 6/2015 | Bustreo et al. |
| 2018/0375407 | A1 | 12/2018 | Sartorius |

FOREIGN PATENT DOCUMENTS

| | | |
|---|---|---|
| CN | 102237727 A | 11/2011 |
| CN | 103109440 A | 5/2013 |
| CN | 203193407 U | 9/2013 |
| CN | 103633751 A | 3/2014 |
| CN | 104040837 A | 9/2014 |
| CN | 206195491 U | 5/2017 |
| CN | 104054238 B | 6/2017 |
| CN | 107276265 A | 10/2017 |
| CN | 107735927 A | 2/2018 |
| CN | 107810592 A | 3/2018 |
| CN | 207588662 U | 7/2018 |
| CN | 108471183 A | 8/2018 |
| EP | 2508749 A1 | 10/2012 |
| EP | 3 038 239 A1 | 6/2016 |

OTHER PUBLICATIONS

Second Chinese Office Action dated Aug. 24, 2022; Appln. No. 201910447712.0.

The First Office Action issued by the EPO dated Feb. 22, 2023; Appln. No. 20813314.0.

The International Search Report mailed Apr. 15, 2020; PCT/CN2020/072998.

The First Chinese Office Action dated Jan. 7, 2022; Appln. No. 201910447712.0 (Concise Explanation of Relevance for CNOA1 in English).

Extended European Search Report dated May 3, 2022; Appln. No. 20813314.0.

The First Indian Office Action dated Apr. 7, 2022; Appln. No. 202117052436.

* cited by examiner

STATOR SUPPORT FOR LARGE-DIAMETER ELECTRIC MOTOR AND STATOR

CROSS REFERENCE TO RELATED APPLICATION

This application is a National Stage of International Application No. PCT/CN2020/072998, filed on Jan. 19, 2020, which claims priority to and the benefit of Chinese Patent Application No. 201910447712.0, filed on May 27, 2019, the entireties of which are hereby incorporated herein by reference.

TECHNICAL FIELD

The present disclosure relates to a technical filed of electric motors, and particularly relates to a stator support and a stator.

BACKGROUND

As a single-machine power of a wind-power electric generator set becomes larger and larger, an outer diameter of an electric motor becomes larger and larger. If an outer diameter of a large-diameter electric motor exceeds a road transportation limiting value, for example, greater than 5 m, the transportation difficulty and the cost of the electric motor will be increased.

SUMMARY

The object of the present disclosure is to provide a stator support and a stator; the stator support can at least arrange a stator ring connected with a stator iron core of an electric motor in segments in a circumferential direction to facilitate transportation.

In one aspect, the stator support is provided by the present disclosure. The stator support is applied to a large-diameter electric motor. The stator support includes a stator shaft, being coaxially connectable to a fixing shaft of the electric motor; a supporting assembly, coaxially arranged at an outer circumference of the stator shaft; a stator ring, being connectable to a stator iron core of the electric motor, in which the stator ring includes two or more stator ring segments continuously distributed in a circumferential direction of its own, each of the stator ring segments is in a sector shape, and the two or more stator ring segments are coaxially arranged at an outer circumference of the supporting assembly.

In another aspect, the stator is provided by the present disclosure. The stator includes the stator support as described above; a stator iron core, detachably connected to an outer circumference of the stator ring of the stator support, and including two or more stator iron core segments distributed in the circumferential direction of its own; and a stator winding set, including two or more stator winding set segments distributed in a circumferential direction of its own, in which the stator winding set segments are arranged in the stator iron core segments.

In the stator support and the stator provided by the present disclosure, the stator ring connected with the stator iron core of the electric motor is divided into two or more stator ring segments in the circumferential direction, so that a maximum contour dimension of each of the stator ring segments can be controlled within the transportation limiting value, thereby solving the difficult transportation problem of the stator support of the large-diameter electric motor.

BRIEF DESCRIPTION OF THE DRAWINGS

The present disclosure can be better understood from the following description of the specific embodiments of the present disclosure in conjunction with the drawings; herein, by reading the following detailed description of the non-limiting embodiments with reference to the drawings, other features, objects, and advantages of the present disclosure will become more apparent, and the same or similar reference signs indicate the same or similar features.

DETAILED DESCRIPTION

Figure 1:
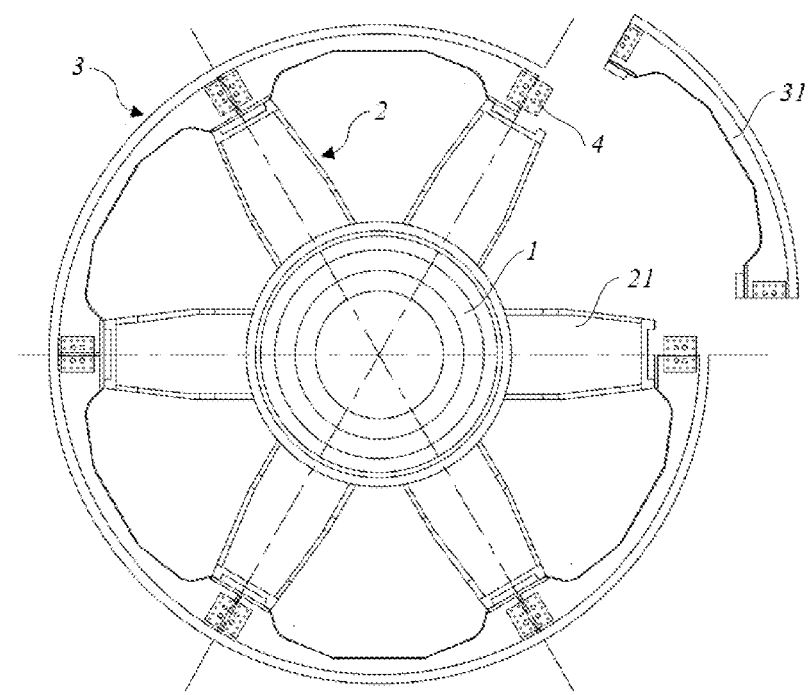
FIG. 1 shows a structural schematic view of a stator support according to an embodiment of the present disclosure.

The features and exemplary embodiments of various aspects of the present disclosure will be described in detail below. Many specific details are disclosed in the following detailed description in order to fully understand the present disclosure. However, it is obvious to those skilled in the art that the present disclosure can be implemented without some of these specific details. The following description of the embodiments is merely to provide a better understanding of the present disclosure by showing examples of the present disclosure. The present disclosure is by no means limited to any specific configurations and algorithms proposed below, but covers any modification, replacement and improvement of elements, member and algorithms without departing from the spirit of the present disclosure. In the drawings and the following description, well-known structures and technologies are not shown in order to avoid unnecessary obscurity of the present disclosure.

In order to better understand the present disclosure, a stator support and a stator provided by some embodiments of the present disclosure will be described in detail below in conjunction with FIG. 1 to FIG. 8.

Referring to FIG. 1, the stator support 10 is provided by an embodiment of the present disclosure. The stator support 10 is applied to a large-diameter electric motor. The stator support 10 includes a stator shaft 1, a supporting assembly 2 and a stator ring 3.

The stator shaft 1 can be coaxially connected to a fixing shaft of the electric motor; the stator shaft 1 is generally formed by means of machining process after adopting a steel material for integral casting.

The supporting assembly 2 is coaxially arranged at an outer circumference of the stator shaft 1 to improve the bearing capacity of the stator shaft 1.

The stator ring 3 can be connected to a stator iron core of the electric motor; the stator ring 3 includes two or more stator ring segments 31 continuously distributed in a circumferential direction of its own, each of the stator ring segments 31 is in a sector shape, and the two or more stator ring segments 31 are coaxially arranged at an outer circumference of the supporting assembly 2.

The stator ring 3 is generally formed by means of machining process after adopting the steel material for integral casting or welding. After the stator ring 3 is manufactured in a processing site, it can be divided into two or more, such as 6, stator ring segments 31 in the circumferential direction by means of laser cutting or the like, and a circumferential angle occupied by each of the stator ring segments 31 is 60°.

In order to ensure a vacuum pressure impregnation process requirement of a stator winding set arranged in the stator iron core, a maximum contour dimension of each of the stator ring segments 31, that is, a dimension of a maximum chord length, needs to be smaller than a dimension of an inner diameter of a paint dipping tank in the factory. On the other hand, the dimension of the maximum chord length of each of the stator ring segments 31 is controlled within the transportation limiting value. For example, the dimension of the maximum chord length of each of the stator ring segments 31 is less than 4.5 m, which is convenient for transporting two or more stator ring segments 31 from the processing site to an assembling site.

In the stator support 10 provided by the embodiments of the present disclosure, at least the stator ring 3 connected with the stator iron core of the electric motor is divided into two or more stator ring segments 31 in the circumferential direction, so that the maximum contour dimension of each of the stator ring segments can be controlled within the transportation limiting value, thereby solving the difficult transportation problem of the stator support 10 of the large-diameter electric motor.

A specific structure of the stator support 10 will be described in further detail below with reference to the drawings.

Figure 2:
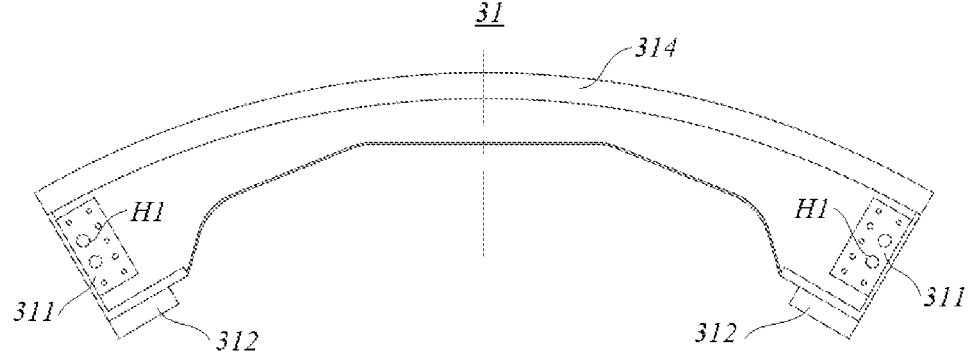
FIG. 2 shows a structural schematic view of a stator ring segment in the stator support shown in FIG. 1.
Figure 3:
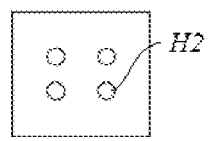
FIG. 3 shows a structural schematic view of a base plate in the stator support shown in FIG. 1.

Referring to FIG. 1 to FIG. 3 together, the stator support further includes a connecting assembly 4, and two adjacent stator ring segments 31 are fixed to each other in the circumferential direction by the connecting assembly 4.

Specifically, two ends of each of the stator ring segments 31 in the circumferential direction of its own respectively have two connecting faces 311, and each of the connecting faces 311 is provided with a first through hole H1 penetrating in an axial direction. The number of the first through holes H1 may be two or more.

The connecting assembly 4 includes a base plate 41 and a fastening member (not shown in the drawings). The base plate 41 is attached to two adjacent connecting faces 311 of the two adjacent stator ring segments 31 on at least one side of in the axial direction, second through holes H2 corresponding to positions of the first through holes H1 of the two adjacent connecting faces 311 are formed on the base plate 41, and the number of the second through holes H2 may be four or more. The fastening member can pass through the second through holes H2 and the first through holes H1 to connect the base plate 41 with two adjacent stator ring segments 31.

Optionally, two base plates 41 are respectively attached to the two adjacent connecting faces 311 corresponding to two sides in the axial direction of the two adjacent stator ring segments 31, so as to improve the connecting strength of the two adjacent stator ring segments 31 in the circumferential direction.

In order to facilitate the assembly and disassembly of the stator support 10, the stator shaft 1 and/or the stator ring segments 31 are detachably connected to the supporting assembly 2. Herein, the supporting assembly 2 includes two or more connecting arms 21 radiatingly distributed on the outer circumference of the stator shaft 1.

Figure 4:
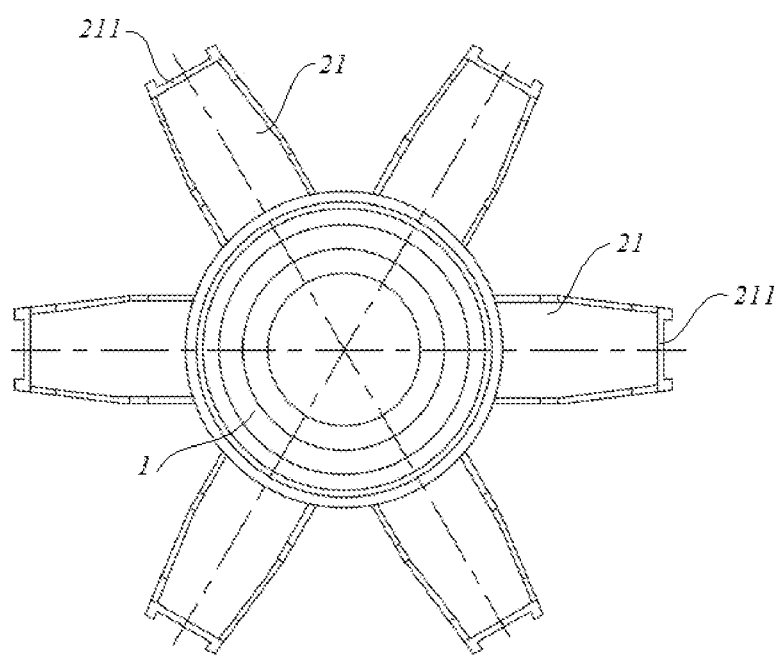
FIG. 4 shows a structural schematic view of a stator shaft and a supporting assembly in the stator support shown in FIG. 1.

Referring to FIG. 2 and FIG. 4 together, the stator ring segments 31 are detachably connected to the supporting assembly 2, and optionally, the number of the stator ring segments 31 and the number of connecting arms 21 are equal, for example, each of the numbers is 6. Each of the stator ring segments 31 is provided with first extension portions 312, the first extension portions 312 are respectively arranged at two ends of each of the stator ring segments 31 in the circumferential direction of its own; each of the connecting arms 21 is provided with a first connecting portion 211, and two adjacent first extension portions 312 of two adjacent stator ring segments 31 are matched with the first connecting portion 211, so that each two adjacent stator ring segments 31 are detachably connected to one of the connecting arms 21.

In some embodiments, either of the first extension portions 312 and the first connecting portion 211 can be stacked with the other one; the fastening member can pass through the two adjacent first extension portions 312 and the first connecting portion 211 to detachably connect the two stator ring segments 31 to one of the connecting arms 21.

In some embodiments, either of the first extension portions 312 and the first connecting portion 211 may form a first convex structure protruding toward the other one, and the other one may form a first concave structure matching with the first convex structure; two adjacent first convex structures are arranged to be inserted into the first concave structure, or the first convex structure is inserted into two adjacent first concave structures, so as to detachably connect the two stator ring segments 31 to one of the connecting arms 21.

In order to improve the connecting strength between the first extension portions 312 and the first connecting portion 211, two adjacent first extension portions 312 and the first connecting portion 211 may also be connected together by the fastening member.

Figure 5:
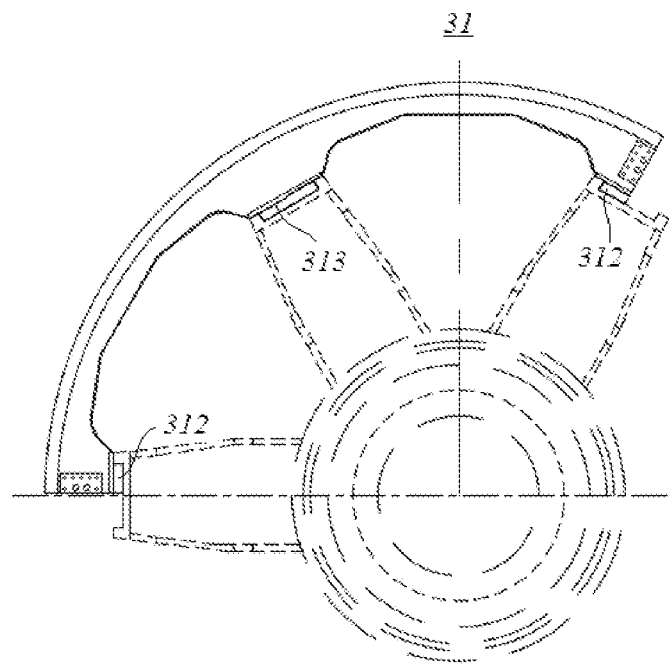
FIG. 5 shows a structural schematic view of another stator ring segment in the stator support shown in FIG. 1.

Referring to FIG. 5, in some embodiments, the number of the stator ring segments 31 is less than the number of the connecting arms 21, for example, the number of the stator ring segments 31 is 3 and the number of the connecting arms 21 is 6. In addition to the first extension portions 312 arranged at the two ends of each of the stator ring segments 31 in the circumferential direction, each of the stator ring segments 31 may be further provided with a second extension portion 313 arranged to be spaced apart from the first extension portions 312, and the second extension portion 313 is matched with the first connecting portion 211 of each of the connecting arms 21. In order to improve the versatility of the connecting arms 21, a dimension of the second extension portion 313 in the circumferential direction and a dimension of the second extension portion 313 in the radial direction are the same as a dimension of the two adjacent first extension portions 312 in the circumferential direction and a dimension of the two adjacent first extension portions 312 in the radial direction respectively, and a detachable connecting manner between the second extension portion 313 and one of the connecting arms 21 is similar to a detachable connecting manner between the first extension portions 312 and one of the connecting arms 21, and will not be repeated here.

Figure 6:
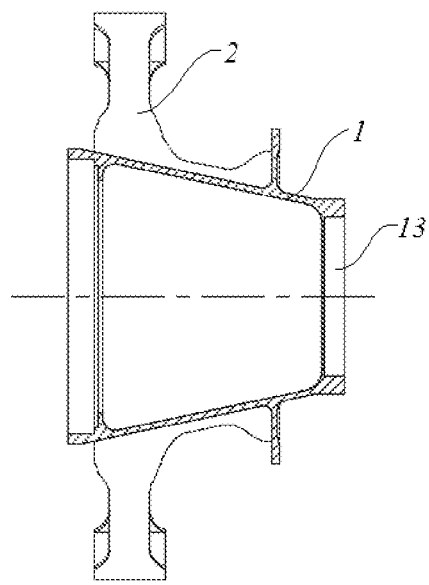
FIG. 6 shows a schematic longitudinal sectional view of the stator shaft and the supporting assembly shown in FIG. 4.

Referring to FIG. 6, an inner flange 13 is arranged at an end of the stator shaft 1 in the axial direction, a threaded hole is formed on an end face of the inner flange 13, and a corresponding flange structure is generally arranged at an outer circumference of the fixing shaft, and the stator shaft 1 is coaxially connected with the fixing shaft through the inner flange 13.

Figure 7:
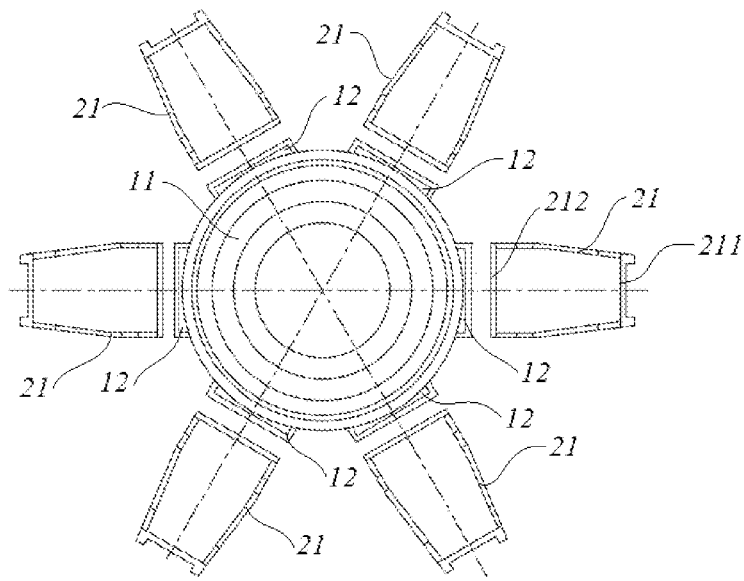
FIG. 7 shows an exploded structural schematic view of a stator shaft and a supporting assembly in another stator support provided by an embodiment of the present disclosure.

Referring to FIG. 7, in order to be able to transport the stator support 10 with a larger diameter, the stator shaft 1 is detachably connected with the supporting assembly 2, the stator shaft 1 includes a cylinder-shaped body 11 and two or more fixing portions 12 arranged at an outer circumference of the cylinder-shaped body 11, and the two or more connecting arms 21 are connected to the two or more fixing portions 12 in a one-to-one correspondence.

Since the supporting assembly 2 is detachably connected with the stator shaft 1, various connecting arms 21 of the stator shaft 1 and the supporting assembly 2 can be transported separately, so that a maximum dimension of the stator shaft 1 and a maximum dimension of the connecting arm 21 can be controlled within the transportation limiting value, and a diameter dimension of the stator shaft 1 can also be made larger to meet the operation requirements.

Specifically, the connecting arms 21 respectively have second connecting portions 212 facing to the fixing portions 12, and the fixing portions are respectively matched with the second connecting portions 212, so that the stator shaft 1 is detachably connected to two or more connecting arms 21.

In some embodiments, either of the fixing portion 12 and the second connecting portion 212 can be stacked with the other one, and the fastening member passes through the fixing portion 12 and the second connecting portion 212 to detachably connect the stator shaft 1 to the connecting arms 21.

In some embodiments, either of the fixing portion 12 and the second connecting portion 212 may form a second convex structure protruding toward the other one, and the other one may form a second concave structure matching with the second convex structure; the second convex structure is arranged to be inserted into the second concave structure, so as to detachably connect the two stator ring segments 31 to one of the connecting arms 21.

In order to improve the connecting strength between the fixing portion 12 and the second connecting portion 212, the fixing portion 12 and the second connecting portion 212 may also be connected together by the fastening member.

In addition, as shown in FIG. 2, a fixing groove 314 recessed inward is formed at a side of the stator ring segment 31 away from the connecting arm 21 in the radial direction, and the stator ring segment 31 is connected to a stator iron core segment arranged in segments through the fixing groove 314. The fixing groove 314 may be, for example, but not limited to, a dovetail groove.

Thus, in the stator support 10 provided by the embodiments of the present disclosure, the stator shaft 1 and/or the stator ring segments 31 are detachably connected to the connecting arms 21 of the supporting assembly 2, the connecting arms 21, the stator shaft 1 and the stator ring segments 31 of the stator support 10 can be designed in a modularity, so as to improve the processing accuracy of each of modular components, so that it is conducive to reducing costs.

Figure 8:
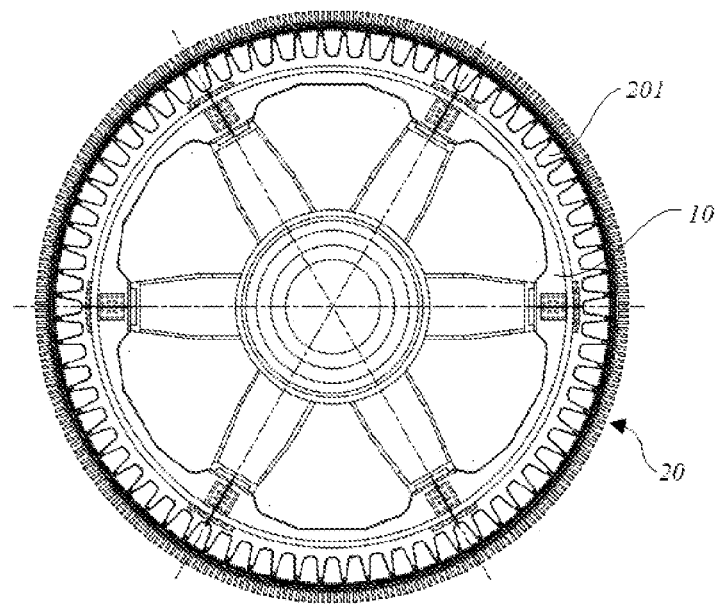
FIG. 8 shows a structural schematic view of a stator according to an embodiment of the present disclosure.

Referring to FIG. 8, the stator is provided by the embodiments of the present disclosure. The stator includes any stator support 10 as described above, the stator iron core 20 and the stator winding set (not shown in the drawings).

The stator iron core 20 is detachably connected to an outer circumference of the stator ring 3 of the stator support 10, and the stator iron core 20 includes two or more stator iron core segments 201 distributed in the circumferential direction of its own. The stator iron core segments 201 are generally made of laminated silicon steel sheets, and each of the stator iron core segments 201 is respectively and correspondingly arranged on the outer circumference of the stator ring segments 31.

The stator winding set includes two or more stator winding set segments distributed in the circumferential direction of its own, and the stator winding set segments are arranged in the stator iron core segments 201.

The stator provided by the embodiments of the present disclosure adopts the stator support 10 as describe above, which can improve the convenience of transporting the stator support 10 of the electric motor with a larger diameter.

Those skilled in the art should understand that the above-mentioned embodiments are all illustrative and not limited. Different technical features appearing in different embodiments can be combined to achieve beneficial effects. Those skilled in the art should be able to understand and implement other modified embodiments of the disclosed embodiments on the basis of studying the drawings, description, and claims. In the claims, the term "including" does not exclude other means or steps; when an article is not modified with a quantitative word, it is intended to include one/kind or multiple/kind of articles, and can be used interchangeably with "one/kind or multiple/kind of articles; the terms "first" and "second" are used to denote names rather than to indicate any specific order. Any reference signs in the claims should not be understood as limiting the scope of protection. The functions of multiple parts appearing in the claims can be implemented by a single hardware or software module. The appearance of certain technical features in different dependent claims does not mean that these technical features cannot be combined to achieve beneficial effects.

What is claimed is:

1. A stator support, for being applied to a large-diameter electric motor, wherein the stator support comprises
   a stator shaft, being coaxially connectable to a fixing shaft of the large-diameter electric motor;
   a supporting assembly, coaxially arranged at an outer circumference of the stator shaft;
   a stator ring, being connectable to a stator iron core of the large-diameter electric motor, wherein the stator ring comprises two or more stator ring segments continuously distributed in a circumferential direction of its own, each of the two or more stator ring segments is in a sector shape, and the two or more stator ring segments are coaxially arranged at an outer circumference of the supporting assembly.

2. The stator support according to claim 1, wherein the stator support further comprises a connecting assembly, and two adjacent stator ring segments are fixed to each other in the circumferential direction through the connecting assembly.

3. The stator support according to claim 2, wherein two ends of each of the two adjacent stator ring segments in the circumferential direction of its own respectively have two connecting faces, and each of the two connecting faces is provided with a first through hole penetrating in an axial direction;
   the connecting assembly comprises a base plate, attached to two adjacent connecting faces of the two adjacent stator ring segments on at least one side in the axial direction, wherein second through holes corresponding to positions of the first through holes of the two adjacent connecting faces are formed on the base plate; and a fastening member, passing through the second through holes and the first through holes to connect the base plate with the two adjacent stator ring segments.

4. The stator support according to claim 1, wherein the stator shaft and/or the two or more stator ring segments are detachably connected to the supporting assembly.

5. The stator support according to claim 4, wherein the supporting assembly comprise two or more connecting arms radiatingly distributed on the outer circumference of the stator shaft.

6. The stator support according to claim 5, wherein the two or more stator ring segments are detachably connected to the supporting assembly, two ends of each of the two or more stator ring segments are respectively provided with two first extension portions, and each of the two or more connecting arms is provided with a first connecting portion, and two adjacent first extension portions of two adjacent stator ring segments are matched with the first connecting portion.

7. The stator support according to claim 6, wherein a number of the two or more stator ring segments is less than a number of the two or more connecting arms, and each of the two or more stator ring segments is further provided with a second extension portion arranged to be spaced apart from the two first extension portions, and the second extension portion is matched with the first connecting portion.

8. The stator support according to claim 5, wherein the stator shaft is detachably connected to the supporting assembly, the stator shaft comprises a cylinder-shaped body and two or more fixing portions arranged at an outer circumference of the cylinder-shaped body, and the two or more connecting arms are respectively connected to the two or more fixing portions.

9. The stator support according to claim 8, wherein the two or more connecting arms respectively have second connecting portions facing to the two or more fixing portions, and the two or more fixing portions are respectively matched with the second connecting portions, so that the stator shaft is detachably connected to the two or more connecting arms.

10. The stator support according to claim 1, wherein an inner flange is arranged at an end of the stator shaft in an axial direction, and the stator shaft is coaxially connected with the fixing shaft through the inner flange.

11. The stator support according to claim 1, wherein a fixing groove recessed inward is formed at a side of each of the two or more stator ring segments away from the two or more connecting arms in a radial direction.

12. A stator, comprising
the stator support according to claim 1;
the stator iron core, detachably connected to an outer circumference of the stator ring of the stator support, and comprising two or more stator iron core segments distributed in the circumferential direction of the stator iron core; and
a stator winding set, comprising two or more stator winding set segments distributed in the circumferential direction of the stator winding set, wherein the two or more stator winding set segments are arranged in the two or more stator iron core segments.

\* \* \* \* \*